Aug. 11, 1925.
G. A. BUTTRESS
COMPOSITION LATH BOARD
Filed Nov. 5, 1923
1,549,292
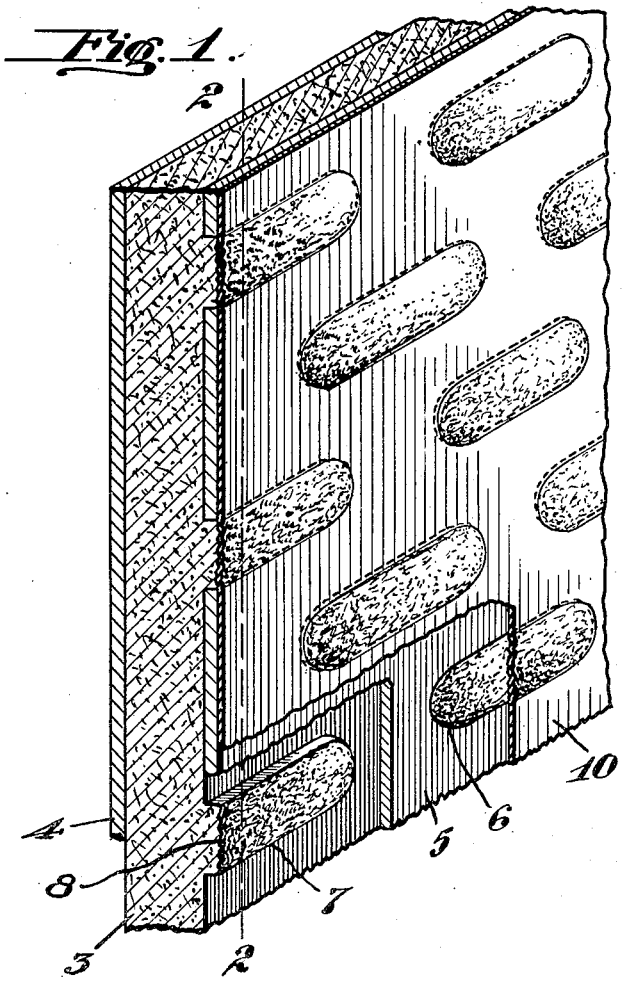
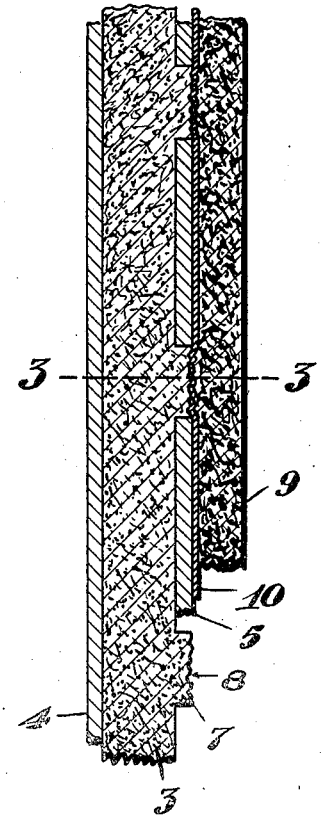
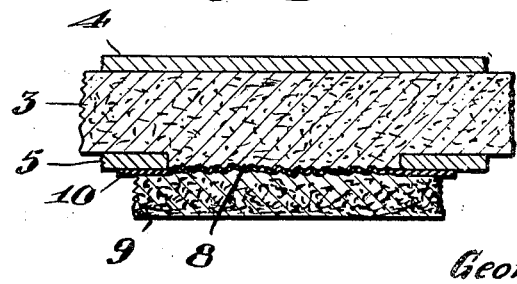
Inventor
George A. Buttress;
By R. S. Berry
Attorney Patented Aug. 11, 1925.

1,549,292

UNITED STATES PATENT OFFICE.

GEORGE A. BUTTRESS, OF LOS ANGELES, CALIFORNIA.

COMPOSITION LATH BOARD.

Application filed November 5, 1923. Serial No. 672,786.

*To all whom it may concern:*

Be it known that I, GEORGE A. BUTTRESS, a citizen of the United States, residing at Los Angeles, in the county of Los Angeles and State of California, have invented new and useful Improvements in Composition Lath Board, of which the following is a specification.

This invention relates to composition lath and wall boards, and particularly pertains to that class of composition boards which embodies a layer of plastic or cementitious material in panel form having its opposite sides covered, at least in part, with facing sheets, and which board also embodies a means for effecting a bond with a surface coating of plaster or cementitious material.

The plastic composition employed in forming the board is ordinarily made of gypsum, that is, plaster of Paris, or a similar product, combined with other materials, which, in the formation of the board, are mixed with water to form a paste that is spread in a layer, which, when dry or set, constitutes a plaster body or panel to which the facing sheets are usually applied in the course of formation of the board.

The facing sheets are formed of fibrous material such as woven fabric or paper, the latter being more generally used because of its cheapness. Where paper facing sheets are employed, various kinds or grades of paper have been used according to particular requirements; in some instances ordinary pulp board being used, and in other cases a paper is employed which has been rendered waterproof or water-resistant by saturating or coating with a practically moisture-impervious substance, such as tar, asphaltum, paraffine or kindred products. In other instances a paper is employed, which, while not being impervious to moisture, is not readily absorptive in quality, so that the facing sheets will not too rapidly absorb water from the wet plastic composition body interposed between the facing sheets.

The bonding means formed on the board by which it is rendered suitable for use as a lath to receive a plastic surface coating, usually comprises openings or recesses in the board, or projections protruding from the board or from recesses in the latter, or may comprise roughened surface of the plaster body exposed through openings in the facing sheet, as shown in United States Letters Patent No. 1,449,728, issued March 27, 1923.

It has been found in practice that while such composition lath board are suitable for use in connection with plasters embodying a gypsum or plaster of Paris constituent, such as plasters that are employed on interior wall surfaces, they are not suitable for use to receive coating of cementitious materials such as are made from hydraulic cements as employed in exterior wall surfaces.

In the case of plaster, the wet plastic mass quickly sets when spread on the wall surfaces and accordingly ordinarily readily adheres to a paper surface, even when the paper be of oily character, as when treated with waterproofing materials. But in the case of cement, the wet plastic mass is so slow in setting that it will not readily adhere to a paper surface, and accordingly rolls up under the trowel when applied to such a surface and pulls away from the paper, particularly when the paper is of oily nature; and furthermore, even after the expenditure of much time and labor the cement is caused to remain in place, which is ordinarily facilitated by the use of wire reinforcements arranged over the surface of the lath board, the cement when set will frequently pull away from the paper of the lath board due to the lack of adhesion so that the lath board does not serve to support the cement coating, and results in the formation of fissures or cracks in the cement coating.

The object of the present invention is to provide a composition lath board embodying a composition panel having a paper facing sheet, in which the facing sheet is coated with a substance which will act to effect a bond between the facing sheet and a cement or plaster coating applied thereto, whereby the coating will be caused to readily adhere to the facing sheet until it has set and to effect such an adhesion between the coating and the board as to form a permanent bond after the cement or plaster has set.

A further object is to provide a coating for composition lath boards which, while serving to effect adhesion between the cement or plaster and a paper surface, will also serve as a coating for exposed areas of the composition body of the board so as to neutralize to a degree the excessive absorptiveness of such exposed areas.

With the foregoing objects in view together with such other objects and advantages as may subsequently appear, my invention resides in the construction and in the method hereinafter set forth and which is illustrated in the accompanying drawings, in which—

Figure 1 is a perspective view of a fragment of a composition lath and wall board as constructed in accordance with the present invention.

Figure 2 is a detail in section as seen on the line 2—2 of Figure 1, showing the lath and wall board with a surface coating as applied thereto and forming a wall surface.

Figure 3 is a detail in section on the line 3—3 of Figure 2.

More specifically, 3 indicates a body of plastic material which is formed into a panel and is covered on one side by a backing sheet 4 of paper or other suitable sheet material, and is covered on its other side by a facing sheet 5 preferably formed of waterproofed or semi-waterproofed fibrous material.

The facing sheet 5 is formed with a series of perforations or apertures 6 which are preferably elongated and arranged in rows with the apertures in one row in staggered relation to the apertures in the adjacent row. Into these apertures the plastic composition of which the body 3 consists projects to form exposed areas of the composition body at intervals throughout the facing sheet, the surface of which exposed areas lie on a plane substantially flush with the outer surface of the facing sheet, and are roughened or scratched to provide a surface having irregular projections or protuberances 8 which will aid the adhesion to the plastic body 3 of a coating 9 of plaster or cement applied to the face of the board.

In carrying out the present invention the facing sheet 5 and the exposed roughened surface of the composition body 3 which project through the apertures 6, are covered with a coat 10 of adhesive material. This adhesive material may be of any suitable nature and may consist, for example of a mixture of glue and dextrine, which has been found to be very successful in commercial practice. The adhesive material preferably employed comprises a mixture of glue and dextrine which is prepared by dissolving dextrine in water and adding thereto glue melted in water. The proportions of the ingredients preferably employed are about fifty gallons of water, seventy-five pounds of dextrine, and twenty-five pounds of glue.

This liquid adhesive material may be applied immediately after the manufacture of the composition board, and allowed to dry, or it may be applied to the board after it has been placed in a wall just previous to the application of the surface coat 9 of plaster or cement to the same. If the former procedure has been followed, the adhesive material will be dry when the plaster is applied, but will be moistened by the water of the plaster or cement so that it will become sticky and readily adhere to the surface coat.

The adhesive mixture of glue and dextrine has been found to be very suitable for application to the waterproofed or oily facing sheet, and has been found to remain permanently affixed thereto. Moreover, such a mixture has proved itself very desirable for applying cement thereto with facility and with the permanent adhesion of the cement.

By thus processing the plaster or cement-receiving face of the lath board I am enabled to employ a facing sheet on the latter which has been treated with tar, asphaltum, paraffin and the like without detracting from the utility of the board as a lath.

In forming a wall surface the composition lath and board comprising the composition body 3 covered with facing sheets 4 and 5, is applied to a suitable backing or support, such as a frame work, as is common in building construction; the adhesive coating 10 being applied to the facing sheet in any suitable manner either before or after the lath board has been mounted to form the walls. The surface coating 9, comprising the usual wet plastic mixture of materials of which plaster or cement is commonly made, including a water constituent, is then applied in the usual manner. The moisture of the wet mixture serves to soften the adhesive coating 10 and acts to render the latter sticky so that the plaster mixture will readily adhere thereto and be so held in place throughout the surface of the lath board as not to roll up under the trowel; the protuberances or irregular projections 8 formed on the roughened, exposed areas 7 serving further to hold the coating 9 in place. Furthermore, the wetting of the portions of the adhesive coating lying over the roughened areas 7 will, by reason of the inherent absorptive quality of the composition 3, cause such suction throughout the exposed areas as to assist in holding the plaster coating 9 in place on the face of the lath board, and yet prevent too rapid absorption of moisture from the wet plastic coating 9 by the exposed portions of the composition body 3.

When the coating 9 becomes dry or set the adhesive coating will also dry and set so that the coat 9 will become firmly adhered to the facing sheet as well as to the roughened surface of the exposed areas 7 of the board, so that the board will serve as a support for the coat 9.

In some instances reinforcing wires are placed in front of the lath board to carry the load of the facing coat 9, but which forms no part of the present invention.

I claim—

1. A composition lath board comprising a panel, a facing sheet thereon, and a coating of adhesive material on said facing sheet which is hard when dry but becomes sticky when moistened.

2. A composition lath and wall board comprising a panel of absorptive material, a backing sheet covering one side of said panel, a facing sheet extending over the other side of said panel; said facing sheet being formed with a series of apertures into which portions of the plastic composition project and terminate substantially flush with the outer surface of the facing sheet; the surface of the plastic material being exposed through said apertures and having irregular projections of the absorptive plastic material protruding therefrom forming bonding keys thoughout said exposed surfaces, and a coating of adhesive material on said facing sheet and on the exposed surfaces of said plastic material.

3. A composition lath and wall board comprising a panel of plastic material, a backing sheet covering one side of said panel and a facing sheet extending over the other side of said panel, said facing sheet being formed with a series of apertures and the plastic body formed with portions projecting into said apertures and terminating substantially flush with the outer surface of the facing sheet forming exposed areas of plastic material throughout the panel, said exposed areas being roughened, and a coating of adhesive material on said facing sheet and on said exposed areas of said plastic material said adhesive material being adapted to become sticky when moistened.

4. A composition lath and wall board comprising a panel of absorptive plastic material, a backing sheet covering one side of said panel, and a facing sheet extending over the other side of said panel; said facing sheet being formed with a series of apertures into which portions of the plastic composition project and terminate substantially flush with the outer surface of the facing sheet; the surface of the plastic material being exposed through said apertures and having irregular projections of the absorptive plastic material protruding therefrom forming bonding keys throughout said exposed surfaces, and a coating of glue and dextrine on said facing sheet and on the exposed surfaces of said plastic material.

5. A composition lath and wall board comprising a panel of plastic material, a backing sheet covering one side of said panel and a facing sheet extending over the other side of said panel; said facing sheet being formed with a series of apertures and the plastic body formed with portions projecting into said apertures and terminating substantially flush with the outer surface of the facing sheet forming exposed areas of plastic material throughout the panel, said exposed areas being roughened, and a coating of glue and dextrine on said facing sheet and on said exposed areas of said plastic material.

GEORGE A. BUTTRESS.